June 29, 1965     E. SIRTL     3,192,083
METHOD FOR CONTROLLING DONOR AND ACCEPTOR IMPURITIES IN GASEOUS
VAPOR THROUGH THE USE OF HYDROGEN HALIDE GAS
Filed May 15, 1962
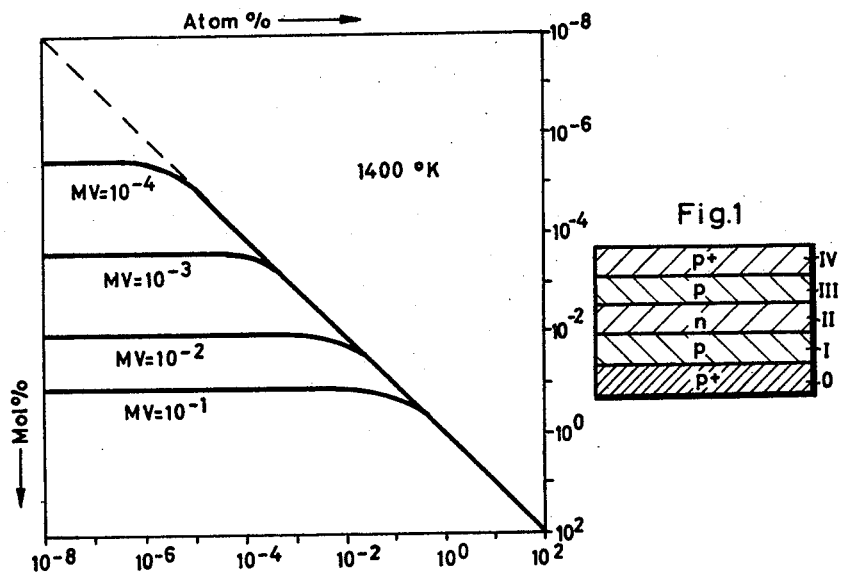
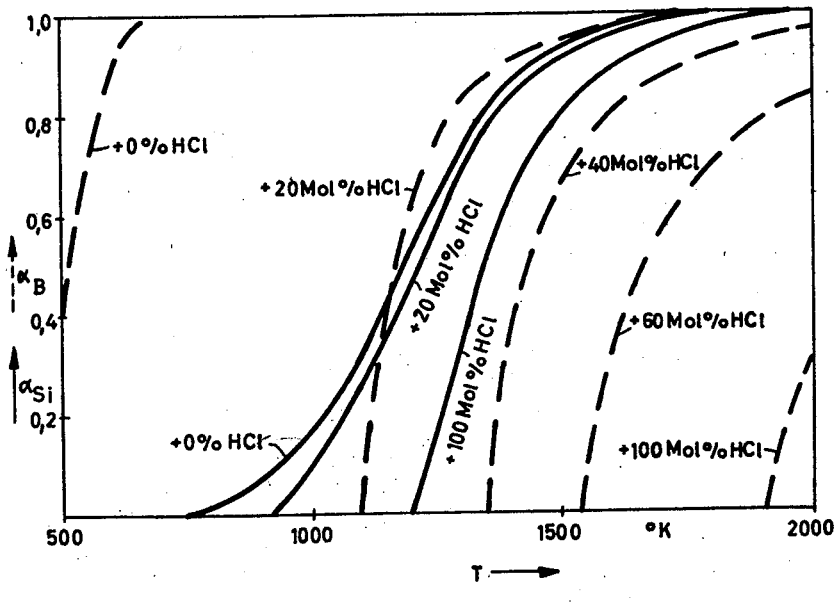

United States Patent Office 3,192,083
Patented June 29, 1965

3,192,083
METHOD FOR CONTROLLING DONOR AND ACCEPTOR IMPURITIES ON GASEOUS VAPOR THROUGH THE USE OF HYDROGEN HALIDE GAS
Erhard Sirtl, Munich, Germany, assignor to Siemens & Halske Aktiengesellschaft, Berlin, Germany, a corporation of Germany
Filed May 15, 1962, Ser. No. 194,829
Claims priority, application Germany, May 16, 1961, S 73,980
6 Claims. (Cl. 148—175)

My invention relates to the pyrolytic production of semiconducting elemental substance, such as silicon, by precipitating it from a reaction gas, which contains a halogen compound of the semiconductor element preferably in mixture with hydrogen, onto a heated carrier of the same elemental substance.

Methods of this type producing monocrystalline silicon are described in the copending applications Serial No. 81,607, filed January 9, 1961 and Serial No. 116,042, filed June 9, 1961, both assigned to the assignee of the present invention. These prior methods are predicated upon the recognition that the quantity of silicon precipitating per unit time onto a unit area of a silicon body by pyrolytic dissociation of the reaction gas, can be controlled by adding hydrogen halide to the reaction gas, and that this also holds good for the precipitation of boron of which a slight amount is contained in the reaction gas in form of a gaseous or vaporous compound, generally as boron chloride or a similar hydrogen-boron-halogen compound. According to the method disclosed in application Serial No. 81,607, the addition of the hydrogen-halogen compound to the reaction gas serves to keep the quantity of the silicon, precipitating from the reaction gas onto the monocrystalline silicon body, so small that the silicon atoms impinging upon the monocrystalline carrier arrange themselves at the chosen surface temperature in monocrystalline orientation into the lattice structure of the carrier so that the semiconductor body grows while remaining a monocrystal. According to the method described in the application Serial No. 146,783, the surface temperature of the silicon carrier is so chosen and the addition of hydrogen-halide to the reaction gas is so adjusted that not only the desired monocrystalline growth of the silicon crystal is secured, but a precipitation of boron from the reaction gas onto the silicon body is prevented. It is also described in the application Serial No. 146,783 to provide a high proportion of the hydrogen-halogen compound in the reaction gas, especially at the beginning of the growing process, in order to thereby subject the surface of the silicon carrier body to material-removing treatment, thus exposing in the reaction vessel the monocrystalline structure of the carrier down to the undisturbed crystal lattice, before commencing the precipitation of silicon onto the carrier by reducing the proportion of the hydrogen-halogen compound in the reaction gas. It is also explained in both above-mentioned applications that the molar ratio of silicon compound to hydrogen in the reaction gas is essential in the performance of the method and hence that by changing this ratio the precipitation process can also be controlled in the desired manner.

The above-mentioned disclosures of the specified earlier applications apply not only to silicon but analogously also to germanium. It is therefore also applicable to precipitate germanium onto a carrier of germanium and/or to adjust and regulate the precipitation of boron from the boron-containing reaction gas by selection of the surface temperature at the monocrystalline carrier of germanium, by the addition and control of a proportion of hydrogen-halide in the reaction gas, and by adjustment or control of the molar ratio of germanium compound to hydrogen contained in the reaction gas, this control of boron precipitation during pyrolytic production of germanium being performed in the manner described in the above-mentioned applications with respect to silicon production.

It has also been found that not only the precipitation of boron but also the precipitation of other activator substances, above all acceptor substances from the third main group of the periodic system (Al, Ga, In), for example indium, is controllable in the above-described manner. For the purposes of the present invention, therefore, the means and methods according to the above-mentioned copending applications are employed in the pyrolytic precipitation of silicon or germanium and also in cases where the reaction gas contains other activator compounds in lieu of, or in addition to, boron compound. It has been found, however, that those substances which, like the elements of the fifth main group of the periodic system (N, P, As, Sb), act as donors in germanium or silicon are precipitated virtually in the same atomic ratio to silicon or germanium as this ratio obtains in the reaction gas between the donor substance and the semiconductor substance. That is, the precipitation of the donor substances, particularly phosphorus, is to a great extent independent of the molar ratio of semiconductor compound to hydrogen in the reaction gas and is also independent of the proportion of hydrogen-halide added to the reaction gas. This particular aspect is also involved in my copending application Serial No. 116,042, mentioned above.

It is an object of my invention to improve the controllability and versatility of the doping action obtainable during precipitation of elemental semiconductor substance by the thermo-chemical or pyrolytic methods. Another object, akin to the one just mentioned, is to improve and facilitate the precipitation and epitaxial growth of monocrystalline layers in any desired sequence as to type of conductance, amount of conductance (specific resistance), or both.

According to my invention the above-mtntioned different behavior of substances acting as donors and acceptors respectively in response to the described changes of the reaction gas is advantageously utilized for improved control of doping during monocrystalline precipitation of the semiconductor material. More specifically, according to a feature of my invention, I add to the reaction gas, at least temporarily during the precipitation process, a hydrogen-halide which displaces the reaction equilibrium in disfavor of the semiconductor substance liberated and precipitated by the reaction, the addition being made in such a ratio that activator substance is precipitated simultaneously with the semiconductor substance; and I further vary and thus control the quantitative ratio of semiconductor substance to activator substance precipitating within the same period of time, by varying the proportion of the added hydrogen-halide and/or by varying the molar ratio of semiconductor compound to hydrogen in the reaction gas.

For varying the proportion of the added hydrogen-halide in the reaction gas it is preferable to vary only the quantity of the hydrogen-halide supplied to the reaction gas per unit of time, while maintaining the molar ratio (MR) between the semiconductor compound and the hydrogen in the reaction gas unchanged. However, in lieu thereof, or together therewith, the mentioned molar ratio (MR) may also be varied. It is always essential to these variations that the chemical equilibrium in the reaction vessel between the reaction gas and the solid semiconductor body becomes displaced by the change in molar ratio (MR) and/or the proportion of the hydrogen-halide which is added to the reaction gas and which contains neither the semiconductor substance (Si or Ge) nor activators, the displacement in chemical equilibrium being such that the quantitative ratio of the precipitating semiconductor (Si or Ge) substance to the likewise precipitating activator substance that provides the dopant impurity atoms, corresponds to the particular ratio desired in the semiconductor layer being grown.

As mentioned, activator substances from the third main group of the periodic system, particularly boron, have been found especially favorable for performing the method according to the invention. However, in order to afford controlling during precipitation of germanium or silicon the value of extrinsic conductance as well as the production of p-n junctions, I add, according to another feature of my invention, another activator substance to the reaction gas, preferably in form of a compound. The second activator substance is preferably a halogenide or a halogenated hydrogen compound, which reacts upon the changes in reaction-gas composition to a considerably lesser extent, or not at all, or in the opposite manner as the first mentioned activator substance, and which produces the opposite type of conductance in the semiconductor. Consequently, if the first activator substance acts as an acceptor in the semiconductor body, then the second activator substance, which only weakly or opposingly reacts to the changes of the reaction gas, is effective as a donor in the semiconductor, or vice versa.

According to my invention, therefore, it is preferable to produce layers of respectively different conductance during continued crystalline growth by having the reaction gas contain donor as well as acceptor compounds, and by controlling or regulating during growth of the layers the ratio of donor to acceptor quantities that precipitate from the gas, such control being effected by the above-described changes of the reaction gas. In this manner the type of conductance from layer to layer can be changed, if desired.

The example described hereinafter with reference to the accompanying drawing shows how during production of a monocrystalline semiconductor body the amount as well as the type of conductance can be adjusted from layer to layer by the above-mentioned changes in the reaction gas. For this purpose, the activator substance whose precipitation quantity per time unit is to be controlled by the changes in the reaction gas need not be precipitated continuously. The precipitation of the activator substance can rather be prevented during certain intervals of time by a corresponding choice of the reaction-gas composition.

On the accompanying drawing:

FIG. 1 is a schematic sectional diagram of a monocrystal comprising five layers of respectively different conductance properties.

FIGS. 2 and 3 are explanatory graphs relating to the production method described presently.

The monocrystal schematically shown in FIG. 1 comprises five layers denoted by 0, I, II, III, IV. The crystal is produced from a thin semiconductor wafer of germanium or silicon which constitutes the layer 0 in the finished crystal. Successively precipitated upon the wafer are the layers I to IV by the method according to the invention with an application of the proper doping. The original wafer as well as the successively grown layers are all monocrystalline. The reaction gas used for precipitation contains the gaseous semiconductor compound from which the semiconductor is caused to precipitate by thermal dissociation onto the surface of the substratum 0. In addition, the reaction gas contains the respective chlorides of a donor substance and of an acceptor substance. In the example more fully described below, the semiconductor body consists of silicon, and the activator substances to act as donors and acceptors consist of phosphorus and boron respectively. In this example, the reaction gas mixture consists of silicon tetrachloride ($SiCl_4$), hydrogen ($H_2$), boron trichloride ($BCl_3$), phosphorus pentachloride ($PCl_5$), and an addition of hydrogen chloride (HCl) which is adjustable down to zero. The surface temperature of the monocrystal during precipitation is 1400° K.=1127° C. The ratio of the mole numbers $n$ of the semiconductor and activator compounds in the reaction gas is:

$n_{BCl_3}/n_{SiCl_4} = 5 \cdot 10^{-6} (= 5 \cdot 10^{-4}$ mol percent)

$n_{PCl_5}/n_{SiCl_4} = 2.5 \cdot 10^{-8} (= 2.5 \cdot 10^{-6}$ mol percent)

This ratio remains constant for the entire growing duration of the layers I to IV. This can be obtained, for example (in accordance with the method described in the application Serial No. 116,042), by adjusting the corresponding boron tribromide, boron trichloride and phosphorus pentachloride concentrations already when these substance are still liquid and admixed to the liquid silicon compound, particularly liquid trichlorsilane. When thereafter the liquid silicon compound is being evaporated in a current of hydrogen, this ratio remains constant. With such a composition of the gas, the doping of the growing silicon can be varied between wide limits by controlling the HCl content and/or by varying the molar ratio (MR) of the silicon tetrachloride compound to hydrogen in the reaction gas. A complete precipitation of boron is obtained with the stated molar ratio if no HCl is added to the gas. Then the specific resistance of the growing silicon layer is 0.15 ohm cm., and the layer has p-type conductance. With an additional 1 mol percent $HCl/H_2$ ($n_{HCl}/n_{H_2} = 10^{-2}$) the boron precipitation in the growing silicon layer is prevented; due to the precipitating phosphorus, the layer assumes a specific resistance of 4 ohm cm. and has n-type conductance.

Consequently, by adding HCl to the reaction gas, the change in conductance type and in magnitude of conductance can be obtained without changing the above-stated mole ratio of activator compounds to semiconductor compound in the gas. The same effect can be obtained by varying the molar ratio MR of the silicon compound ($SiCl_4$) and hydrogen ($H_2$) in the reaction gas, in which case likewise the molar ratio of activator compounds to semiconductor compound may remain unchanged. For example, a minimum concentration for the boron halogenides in the reaction gas of about $2 \cdot 10^{-2}$ mol percent can be obtained by merely changing the molar ratio (MR) of the silicon compound and the hydrogen from $10^{-3}$ down to $10^{-2}$ without changing the molar ratio of boron chloride to silicon compound in the reaction gas. The minimum concentration of boron halogenide in the reaction gas is determined by the constant $K_p = 0.63$ which can be computed from the partial pressure p of boron chloride according to the formula:

$$K_p = \frac{p^3_{HCl}}{p_{BCl_3} \cdot p^3_{H_2}} = 6.3 \cdot 10^{-1}$$

wherein $p_{HCl}$, $p_{BCl_3}$ and $p_{H_2}$ denote the respective partial pressures of HCl, $BCl_3$ and $H_2$ in atmospheres (atm.). That is, with a molar ratio $MR = n_{SiCl_4}/n_{H_2} = 10^{-2}$, only boron is contained in the precipitated silicon if the atom ratio of boron to silicon in the reaction gas is $\geq 2\cdot 10^{-4}$, as is the case in the compounds of boron and silicon employed in the example. Consequently, at the above-mentioned molar ratio MR and the above-stated boron chloride concentration of $5\cdot 10^{-6}$, relating to the semiconductor compound ($SiCl_4$), boron is no longer precipitated, and the growing silicon layer assumes n-type conductance and a specific resistance of 4 ohm cm. due to the virtually complete precipitation of phosphorus from the phosphorus pentachloride ($PCl_5$).

The following table indicates in the second and third columns the conductance type and the specific resistance $\zeta$ (in ohm cm.) of the individual layers I–IV of the semiconductor crystal shown in FIG. 1 which, by the method according to the invention, are precipitated in monocrystalline constitution upon the monocrystalline substratum denoted by 0:

| (1) Layer | (2) Conductance type | (3) $\zeta$ ohm cm. | (4) $MR = \dfrac{n_{SiX_4}}{n_{H_2}}$ | (5) Mol percent added $n_{HCl}/n_{H_2}$ |
| --- | --- | --- | --- | --- |
| I | p | 0.3 | $2\cdot 10^{-3}$ | 0.2 |
| II | n | 4 | $>5\cdot 10^{-3}$ | 1 |
| III | p | 0.3 | $2\cdot 10^{-3}$ | 0.2 |
| IV | p+ | 0.15 | $10^{-3}$ | 0 |

Column 4 of the table indicates the mole ratio (MR) of the silicon compound designated by $SiX_4$, for example $SiHCl_3$, to the amount of hydrogen that must be contained in the reaction gas flowing into the reaction vessel in order to obtain in the precipitated layers the particular desired conductance properties with the above-stated proportions of the activator compounds, no HCl being added to the reaction gas. Consequently, the desired control of the resulting properties is obtainable without the addition of hydrogen-halide. The same conductance properties in the individual layers I–IV, with the molar ratio (MR) of $10^{-3}$ between the Si-compound and the hydrogen, can also be produced by adding to the reaction gas the mole percentage of HCl stated in column 5 of the table. Thus, for producing the layer I with p-type conductance and a specific resistance of 0.3 ohm cm., the mole ratio according to column 4 without any HCl addition is to be $MR = 2\cdot 10^{-3}$. In layer II of the molar ratio MR is to be increased to $5\cdot 10^{-3}$. During growth of layer III the ratio is to be reduced back to the value $2\cdot 10^{-3}$ and, ultimately, for producing layer IV, the ratio is to be reduced to $10^{-3}$. With the above-stated concentrations of the boron compounds and phosphorus compounds in the reaction gas, the desired conductance magnitudes then result in the respective layers I–IV.

The same results can be obtained, in accordance with the fifth column of the table, by maintaining the molar ratio (MR) of silicon compound to hydrogen in the reaction gas constant at $10^{-3}$, but adjusting the mole percentage of HCl in the reaction gas to 0.2 during growth of layer I, then increasing the HCl percentage to 1 during growth of layer II, thereafter reducing the precentage back to 0.2 during growth of layer III, and entirely eliminating the HCl addition while layer IV is being grown.

Changes in molar ratio (MR) and changes in proportion of HCl can also be combined with each other for obtaining the desired sequence of layer properties during the pyrolytic growing process.

The coordinate diagram shown in FIG. 2 indicates the influence of the molar ratio of silicon compound to hydrogen in the reaction gas for a precipitation temperature of 1400° K. at the surface of the monocrystal upon which the silicon is being precipitated, relative to the molar ratio of boron compound to silicon compound in the reaction gas. The horizontal reference axis indicates the atom percentage of precipitating boron to precipitating silicon. The vertical reference axis indicates the atom percentages of boron to silicon, or rather the corresponding mole percentages of the compounds that contain these respective activator and semiconductor substances in the reaction gas.

The boron compounds consist of boron chloride $BCl_3$ or boron bromide $BBr_3$, for example. The silicon compounds consist, for example, of silicon chloride $SiCl_4$ or silico-chloroform $SiHCl_3$. The molar ratios (MR) of silicon compound to hydrogen in the reaction gas are entered as parameter legends at the respective curves shown. At precipitation equilibrium different molar ratios (MR) furnish respectively different hydrogen-halogen partial pressures. As is apparent from FIG. 2, this hydrogen-halogen concentration determines to a great extent the particular concentration range of the hydrogen-halide contained in the reaction gas, within which the doping of the precipitating semiconductor substance can be changed by changing this concentration. For example, when the molar ratio $MR = 10^{-2}$ (note the corresponding horizontal branch of the curve $MR = 10^{-2}$), boron precipitates in silicon only if the atom percent ratio of boron to silicon in the reaction gas is at least $10^{-2}$ atom percent. If the atom percent share of boron is greater, boron will also precipitate with this same greater atom percent share in the growing silicon layer (note the approximately diagonal branch of the curve). However, if the share of boron corresponds to the limit concentration, the share of boron precipitating together with the silicon can be increasingly suppressed by an increasing addition of a hydrogen halide, such as HCl particularly (note the horizontal branch of the curve). For rapidly obtaining such a change doping, the opening from which the hydrogen-halogen compound is added to the flow of reaction gas, is preferably placed as close as feasible to the inlet nozzle through which the reaction gas passes into the reaction vessel.

As is also apparent from FIG. 2, the curves for different MR values approximately coincide with the diagonal, when the concentration of the activator compound (for example $BCl_3$) relative to the semiconductor compound (for example $SiHCl_3$) is larger than the minimum concentration of this concentration range. In this case the ratio of boron in silicon after precipitation is essentially equal to the atom percent ratio of boron to silicon in the reaction gas. On this branch of the curve a change in doping of the precipitating silicon by conjointly precipitating boron is virtually possible only by correspondingly changing the atom percent ratio of boron to silicon in the reaction gas. However, according to the invention, the atom percentage of the boron precipitating together with the silicon can also be effected on the horizontal branch of the curve for a given molar ratio (MR) by increasingly suppressing the boron precipitation, that is, by increasing the hydrogen-halide concentration in the reaction gas. This will be apparent also from FIG. 3 discussed presently.

The coordinate diagram according to FIG. 3 indicates how such an HCl addition to the reaction gas at a constant molar ratio (MR) causes a change in the atom percentage of boron in the precipitated silicon along the horizontal branch of an MR curve as shown in FIG. 2. FIG. 3 represents the quantity of the precipitating activator substance, for example boron, and of the semiconductor substance (silicon) in dependence upon the temperature T (in ° K.) at the surface of the carrier body upon which the semiconductor substance and the activator substance precipitate with the molar ratio (MR) which, in the example of FIG. 3, is $MR = 0.05$ at that surface. The vertical reference axis of the diagram denotes by $\alpha$ the share of semiconductor or activator substances precipitating onto the carrier body from the total quantity of semiconductor and activator substances available in the reaction gas. This share is denoted by $\alpha_B$ with respect to the precipitation of boron, and by $\alpha_{Si}$ relative to silicon. The broken-line curves in FIG. 3 indicate the dependence of the boron share $\alpha_B$ upon the temperature at the surface at which the boron precipitates and upon the parameter of the hydrogen-halogen compound, particularly HCl, added to the reaction gas. In the reaction gas the molar ratio $$MR = \frac{n_{SiHCl_3}}{n_{H_2}} = 0.05$$

and the molar ratio of boron compound ($BCl_3$) to semiconductor compound ($SiHCl_3$) is equal to 0.1 mol percent. It will be noted that the quantity of boron precipitating from the reaction gas changes extremely much when the HCl addition is increased from 0% to 100% (relative to the quantity of silicon halogenide being supplied). In comparison with such an extreme change of the proportion $\alpha_B$ in dependence upon the parameter of the HCl addition to the reaction gas, the change in the share $\alpha_{Si}$ of silicon precipitating from the reaction gas is relatively very slight. For example, as can be seen from the parameter legends along the curves in FIG. 3, the share $\alpha_B$ of boron, when operating at a precipitation temperature of about 1400° K. at the surface receiving the precipitate, can be reduced from almost 100% down to 0% by increasing the HCl addition from 20 mol percent to about 50 mol percent HCl. At the same time the resulting change in the precipitating share $\alpha_{Si}$ of silicon changes only from about 0.9 to about 0.8. That is, when changing the HCl addition from 20 to 50 mol percent, the quantity of silicon precipitating from the reaction gas changes very little, whereas the quantity of the precipitating boron changes to a great extent.

I claim:

1. In the method of producing an electronic semiconductor crystal by pyrolytically precipitating and doping the semiconductor substance onto a heated carrier body from a reaction gas containing hydrogen, and a gaseous compound of the semiconductor substance, the steps of adding gaseous compounds of doping agents to the reaction gas, one of said doping agents having acceptor action and the other of said doping agents having donor action, maintaining the quantity of doping agents in the reaction gas substantially constant, adding a hydrogen-halide to said reaction gas containing doping agents for controlling the amount of deposition of the doping materials, the ratio of the quantity of doping agents with donor action to semiconductor substance precipitating in the same interval of time being considerably less dependent than the ratio of the quantity of doping agent with acceptor action upon the proportion of the hydrogen-halide to the reaction gas, and changing the conductance of the growing semiconductor crystal by varying the proportion of the reaction gas.

2. In the method of producing an electronic semiconductor silicon crystal by pyrolytically precipitating and doping the semiconductor substance onto a heated silicon carrier body from a reaction gas containing hydrogen, and a gaseous silicon-halogen compound, the steps of adding gaseous compounds of doping materials to the reaction gas, one of said doping materials being from the third group of the periodic system and having acceptor action and the other of said doping materials being from the fifth group of the periodic system and having donor action maintaining the quantity of doping material in the reaction gas substantially constant, adding a hydrogen-halide to said doping materials containing reaction gas, the ratio of the quantity of doping materials with donor action to semiconductor substance precipitating in the same time interval being considerably less dependent than the ratio of the quantity of doping material with acceptor action upon the proportion of the hydrogen-halide added to the reaction gas, and changing the conductance of the growing semiconductor crystal by varying the proportions of the reaction gas.

3. In the method of producing an electronic semiconductor germanium crystal by pyrloytically precipitating and doping the semiconductor substance onto a heated germanium carrier body from a reaction gas containing hydrogen, and a gaseous germanium-halogen compound, the steps of adding gaseous compounds of doping materials to the reaction gas, one of said doping materials being from the third group of the periodic system and having acceptor action and the other of said doping materials being from the fifth group of the periodic system and having donor action, maintaining the quantity of doping materials in the reaction gas substantially constant, adding a hydrogen-halide to said doping materials-containing reaction gas, the ratio of the quantity of doping materials with donor action to semiconductor substance precipitating in the same interval of time being considerably less dependent than the ratio of the quantity of doping materials with acceptor action upon the proportion of the hydrogen-halide added to the reaction gas, and changing the conductance of the growing semiconductor crystal by varying the proportions of the reaction gas.

4. In the method of producing an electronic semiconductor crystal by pyrolytically precipitating and doping the semiconductor substance onto a heated carrier body from a reaction gas containing hydrogen, and a gaseous compound of the semiconductor substance, the steps of adding gaseous compounds of doping materials to the reaction gas, one of said doping materials having acceptor action and the other of said doping materials having donor action, maintaining the quantity of doping materials in the reaction gas substantially constant, adding a hydrogen-halide to said reaction gas containing doping materials for controlling the amount of deposition of the doping materials, the ratio of the quantity of doping materials with donor action to semiconductor substance precipitating in the same time interval being considerably less dependent than the ratio of the quantity of doping materials with acceptor action upon the proportion of the hydrogen-halide added to the reaction gas, and changing the amount of conductance of the growing monocrystalline substance by varying the proportion of hydrogen-halide added to the reaction gas.

5. In the method of producing an electronic semiconductor crystal by pyrolytically precipitating and doping the semiconductor substance onto a heated carrier body from a reaction gas containing hydrogen, and a gaseous compound of the semiconductor substance, the steps of adding gaseous compounds of doping materials to the reaction gas, one of said doping materials having acceptor action and the other of said doping materials having donor action, maintaining the quantity of doping materials in the reaction gas substantially constant, adding a hydrogen-halide to said reaction gas containing doping materials for controlling the amount of deposition of the doping materials, the ratio of the quantity of doping materials with donor action to semiconductor substance precipitating in the same time interval being considerably less dependent than the ratio of the quantity of doping materials with acceptor action upon the proportion of the hydrogen-halide added to the reaction gas, and changing the type of conductance of the growing monocrystalline substance by varying the proportion of hydrogen-halide added to the reaction gas.

6. In the method of producing an electronic semiconductor silicon crystal by pyrolytically precipitating and doping the semiconductor substance onto a heated silicon carrier body from a reaction gas containing hydrogen, and a gaseous silicon-halogen compound, the steps of adding gaseous compounds of doping materials to the reaction gas, one of the gaseous doping compounds being $BCl_3$ and having acceptor action and the other of the gaseous doping compounds being $PCl_5$ and having donor action, adding hydrogen chloride to said doping compounds-containing reaction gas, the ratio of the quantity of doping materials with donor action to semiconductor substance precipitating in the same time interval being considerably less dependent than the ratio of the quantity of doping materials with acceptor action upon the proportion of the hydrogen chloride added to the reaction gas, and changing the amount of conductance of the growing monocrystalline substance by varying the proportion of hydrogen chloride added to the reaction gas.

References Cited by the Examiner

UNITED STATES PATENTS

| | | | |
|---|---|---|---|
| 3,011,877 | 12/61 | Schweickert et al. | 252—62.3 |
| 3,068,078 | 12/62 | Kersting | 23—223.5 |
| 3,097,069 | 7/63 | Reuschel | 23—223.5 |
| 3,108,072 | 10/63 | Gutsche | 252—62.3 |
| 3,120,451 | 2/64 | Schmidt et al. | 23—223.5 |

OTHER REFERENCES

Loonam: "Principles and Applications of the Iodide Process," Journal of the Electrochemical Society, vol. 106, No. 3, March 1959, pages 238–244.

DAVID L. RECK, *Primary Examiner.*